G. S. HILTS.

DIVIDED SCREW NUT.

No. 10,523. Reissued Sept. 23, 1884.

Attest.
Geo. Hebard,
L. G. Whitmore.

Inventor.
Geo. S. Hilts.
By E. B. Whitmore,
Atty.

N. PETERS, Photo-Lithographer, Washington, D. C.

UNITED STATES PATENT OFFICE.

GEORGE S. HILTS, OF BATAVIA, NEW YORK.

DIVIDED SCREW-NUT.

SPECIFICATION forming part of Reissued Letters Patent No. 10,523, dated September 23, 1884.

Original No. 294,781, dated March 11, 1884. Application for reissue filed August 25, 1884.

*To all whom it may concern:*

Be it known that I, GEORGE S. HILTS, of Batavia, in the county of Genesee and State of New York, have invented a new and useful Improvement in a Divided Screw-Nut, which improvement is fully set forth in the following specification and accompanying drawings.

The object of my invention is to produce a divided tapering or conical screw-nut for a threaded rod or screw constructed so that by longitudinal motion along its holder it may be opened or have its parts moved laterally away from each other to release the screw to allow the latter to slide freely through it or be made, by said longitudinal motion, to close upon the screw at will, with automatic means to expand the parts of the nut or force them asunder to guide said parts in their lateral motions, so the threads of the same shall at all times register or meet evenly at their ends, and to control their longitudinal motion.

The invention consists in parts and devices hereinbelow fully described, and more particularly pointed out in the claims.

Figure 2:
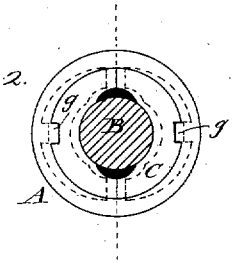
Figure 1:
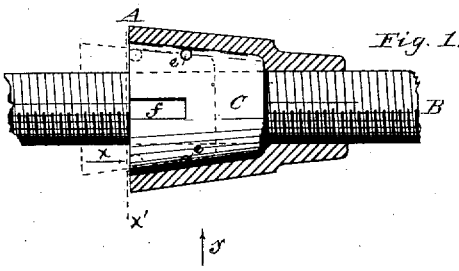
Figure 4:
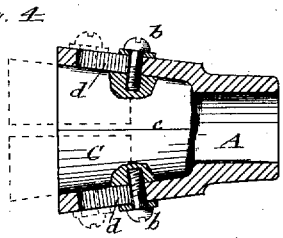
Figure 3:
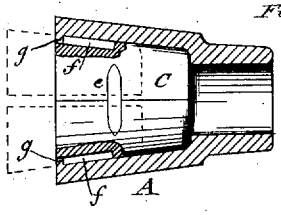
Figure 5:
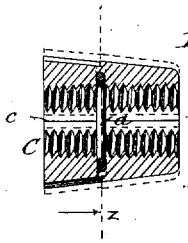

Referring to the drawings, Figure 1 is a side sectional elevation of my invention, in which the cup or holder for the divided nut is sectioned upon its axis, with parts of the screw broken away; Fig. 2, an end elevation of the same, viewed as indicated by arrow *x* in Fig. 1, with the screw cross-sectioned on the dotted line *x'*; Fig. 3, a side elevation of the same parts viewed in a direction at right angles to that in which Fig. 1 is seen, or in the direction indicated by arrow *y* in Fig. 1, in which the holder for the nut is sectioned along its axis to uncover the dowel pin or guide for holding the halves of the nut squarely opposite each other, and the parts of each half-nut longitudinally sectioned to show the guiding-slots in the same; Fig. 4, a similar view to that shown in Fig. 3, showing a different manner of guiding the longitudinal movements of the halves of the nut and effecting their lateral movements; Fig. 5, a view of the inside of a half of the nut sectioned along the axis of the latter, and at right angles to the plane upon which the halves of the nut are divided, (showing one-half of each half-nut,) showing a separating-spring for forcing the halves of the nut apart; and Fig. 6, an end view of the same sectioned on the dotted line *z*, and viewed as indicated by the arrow in Fig. 5. Fig. 7, drawn to a scale one-third that to which the other figures are drawn, shows the adaptability of the invention to machinists' clamps.

Referring to the parts, A is a conical cup or shell, which may form a part of any machine or implement.

B is a screw or threaded rod passing through the cup A, and made to coincide with the axis of the latter.

C is a nut for the screw B, in the form of a truncated cone divided longitudinally upon its axis into halves, and fitted evenly within the cup A, which latter forms a holder for said divided nut, both nut and holder encircling the screw.

The construction of the parts described is such that if the nut be carried wholly within the holder A, as shown in Fig. 3, for instance, the inclined or converging walls of the holder cause the halves of the nut to meet closely, with their threads locked into the threads of the screw, in which case the nut and screw will operate conjointly, like any ordinary nut and screw. Should the nut be carried partially out of the holder to the position shown in dotted lines, and means be employed to separate the halves, as shown, or cause them, when moving toward the more open part of the holder, to remain against and slide along the diverging inner walls or bearings of the holder, the threads of the halves of the nut would be drawn out of the threads of the screw, permitting the latter to be moved longitudinally through the nut and its holder at will.

Figure 6:
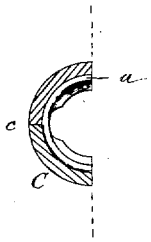
Figure 7:
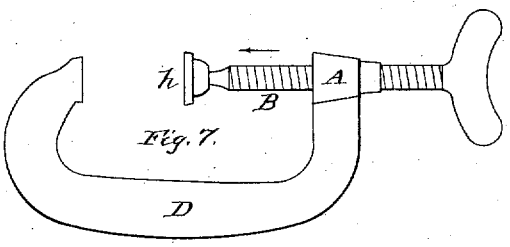

*a*, Figs. 5 and 6, is a spring, forming an automatic means for pushing the halves of the divided nut asunder when the latter is carried partly out of the holder, as stated. This spring is a short piece of spring bar or wire bent nearly concentrically with the curve of nut, embedded in a groove in the nut in a plane at right angles with the axis of the nut, below the bottoms of the threads of the same, and out of the way of the threads of the screw. The spring is compressed when placed within the nut, and its tendency to straighten keeps the halves of the nut (on their convex sides) pressed against the diverging walls of the holder A, and causes them to slide along said inclined walls as bearing or ways when the nut is moved longitudinally in a direction either out of or into the holder.

Instead of the spring *a*, above described, screws *b*, Fig. 4, may be employed to hold the halves of the nut against their bearings upon the holder A, thus drawing them apart as they are moved toward the wider part of the holder. The opposite walls of the holder are slotted longitudinally at *d* to receive the screws, which pass through said slots and enter the convex sides of the half-nuts, as shown. The slots admit of a longitudinal movement of the nut along its bearings with the holder, and the heads of the screws, sliding along the diverging exterior of the holder, draw the halves of the nut asunder as they are moved toward the flaring or wider part of their bearing upon the holder.

*e*, Fig. 3, is one of the two guides, placed on opposite sides of the nut, resting one-half in each half-nut, extending across the joint *c*, between the said halves of the nut. These guide-pins are both secured rigidly in one and the same half-nut, and fitted to slide in cavities in the other. They serve to keep the halves of the nut at all times squarely opposite each other during their various movements within the holder, so the threads will stand opposite each other or register at their ends.

*f f*, Figs. 1, 2, and 3, are equal longitudinal grooves formed in the convex sides of the respective halves of the nut, and *g g* are projections of the holder A entering the grooves *f f*, which together serve to guide the parts of the nut in their longitudinal movements. The projections *g g* also form stops for the parts of the nut and limit their longitudinal motion by encountering the inner ends of the slots as they approach. These grooves and projections are necessary only when the spring *a* is used to expand the nut. When the screws *b* are employed, they form sufficient longitudinal guides and stops for the nut, also, when the spring *a* is used the lateral guides *e* are not needed, said spring assuming the functions of the guides.

Fig. 7 shows a machinist's clamp with my invention applied. The head A of the clamp is formed to hold the divided nut, and by moving the screw in the direction indicated by the arrow the nut will be carried out of the head and expanded sufficiently to allow the screw to be endwise adjusted to the work. The nut being returned within the head, the screw will operate in the usual manner.

The thread upon the screw used with this device may be of any of the common forms of cross-section, excepting the square, which form is not quite as well adapted for this use, on account of the threads of the parts of the nut not so readily entering between the threads of the screw when said parts of the nut are brought against the screw, as stated.

The guides *e* are made of such length that they are never drawn fully out of the cavities in the opposing parts of the nut, and on that account they form constant means by which said opposing parts of the nut are kept evenly opposed to each other and the meeting faces of said parts parallel.

I do not claim, broadly, a divided nut and screw, such device being old; but

What I claim as my invention, and wish to secure by Letters Patent, is—

1. In combination with a screw, B, and cup or holder A, made to encircle the screw, said cup or holder having inclined or diverging walls or bearings, a divided nut, C, for the screw fitted to said bearings of the holder, with automatic means, substantially as described, to force the parts of the nut asunder as they are moved toward the wider or more open part of the bearings of the holder, substantially as and for the purpose set forth.

2. In combination with a screw, B, and cup or holder A, made to encircle the screw, said cup or holder having inclined or diverging walls or bearings, a divided nut, C, for the screw fitted to said bearings of the holder, with automatic means, substantially as described, to cause the parts of the nut to move away from each other in a straight line—that is to say, to cause the parts of the nut to move apart and preserve at all times the parallelism between the meeting faces of the parts of the nut as they are moved toward the wider or more open part of the bearings of the holder, substantially as and for the purpose set forth.

3. In combination with a screw, B, and holder A, fitted to encircle the screw, said holder having diverging walls or bearings, a divided nut, C, for the screw fitted to said bearings or walls of the holder, with guide-pins or projections *b* for the parts of the nut, reaching, respectively, from said parts of the nut into or through openings *a* in the holder, substantially as and for the purpose set forth.

4. The combination of a screw, B, cup or holder A, encircling said screw, and having diverging walls or bearings, divided nut C for the screw fitted to the bearings or walls of the holder, and stops *g* to limit the longitudinal movements of the nut along the bearings of the holder, substantially as set forth.

5. The combination of a screw, B, cup or holder A, encircling said screw, and provided with diverging bearings, a divided nut, C, for the screw fitted to the diverging walls or bearings of the holder, and guides *e* for the parts of the nuts, constructed so as at all times to rest or extend into both opposing parts of the nut to keep said parts evenly opposed to each other at all times during their longitudinal and lateral movements.

6. In combination with the body D and screw B of a clamp, a divided nut, C, substantially as described, for the screw fitted to the head of the clamp so as to move longitudinally along the same, and means, substantially as described, to force the parts of the nut asunder as the latter is moved thus longitudinally, substantially as set forth.

GEO. S. HILTS.

Witnesses:
E. B. WHITMORE,
E. A. SAFFORD.